July 14, 1970  W. F. MANWARING  3,520,767
POROUS POLYMERIC SHEET MATERIAL
Filed Jan. 26, 1968
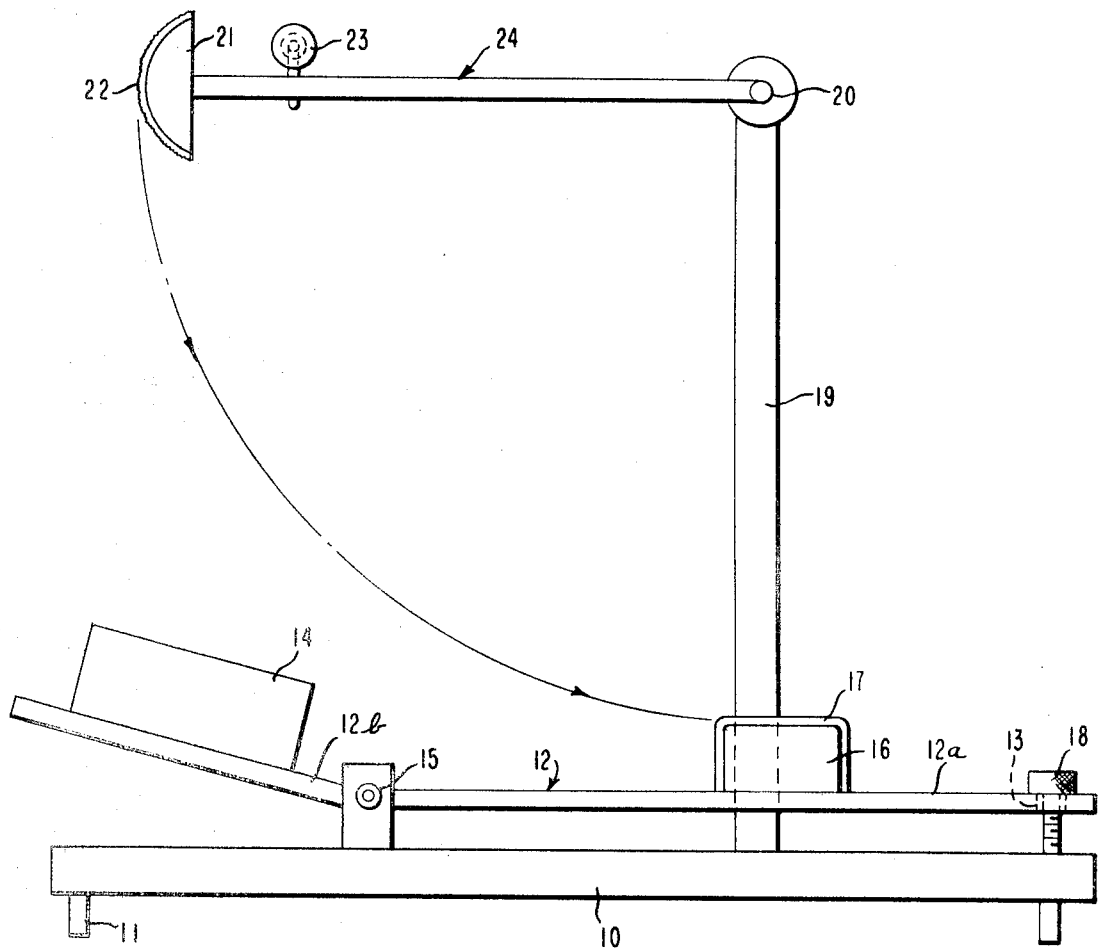
INVENTOR
WILLIAM F. MANWARING
BY *Melville J. Hayes*
AGENT

# United States Patent Office 3,520,767
Patented July 14, 1970

3,520,767
POROUS POLYMERIC SHEET MATERIAL
William F. Manwaring, Madison, Tenn., assignor to E. I. du Pont de Nemours & Co., Wilmington, Del., a corporation of Delaware
Continuation-in-part of application Ser. No. 616,651, Feb. 16, 1967. This application Jan. 26, 1968, Ser. No. 703,846
Int. Cl. B32b 3/26
U.S. Cl. 161—88
13 Claims

ABSTRACT OF THE DISCLOSURE

A moisture-permeable sheet material useful as a shoe-upper material for children's shoes or as an unsupported vapor-permeable film, and having a very fine port structure, the sheet material having unusual scuffing and abrasion resistance. The sheet material has a permeability value of over 750 and the microporous layer has a total pore volume of about 20–35%. Preferably, 65–100% of the pore volume consists of pores having a cross-section diameter of up to about 2 microns, and about 0–35% of the pore volume consists of pores having a cross-section diameter greater than 2 microns.

CROSS REFERENCE TO RELATED APPLICATION

This is a continuation-in-part of my patent application Ser. No. 616,651 filed Feb. 16, 1967, now abandoned.

BACKGROUND OF THE INVENTION

This invention relates to porous polymeric sheet materials; the invention especially concerns vapor-permeable e.g., moisture-permeable) sheet materials, with particular emphasis on flexible leather-like composite sheet materials useful for the manufacture of shoe-uppers.

Previously known man-made leather-like sheet materials, especially those having a desirable combination of flexibility, moisture-permeability and surface smoothness, have not been entirely satisfactory as shoe upper materials for children's shoes as well as other type of shoes subjected to much abuse. The surface of these prior art materials tends to have unsatisfactory resistance to damage when subjected to the impact and the scuffing and abrasive action of such characteristic children's activities as crawling, climbing, kicking, and hiking.

SUMMARY OF THE INVENTION

In a broad sense, the novel product of this invention (sometimes referred to herein as "the sheet material") is a vapor-permeable sheet material having a permeability value of over 750 and comprising a layer of microporous polymeric material, said layer having a total pore volume of about 20–35%.

The pore volume and pore size values given herein are determined by the method described in the A.S.T.M. Bulletin mentioned below on page 3, line 20, except (1) a maximum pressure of 2500 p.s.i. is used, (2) the penetrometer tube is filled at 6.3 p.s.i. and (3) the range of pore sizes determined is about 0.07–100 microns, and (4) a porosimeter volume correction is subtracted from the appropriate sample pore volumes by the amount of volume change, if any, which occurs when the penetrometer is inverted at atmospheric pressure in a blank run (without any sample). The values obtained can be referred to as porosimeter cross-section diameters and porosimeter pore volume.

BRIEF DESCRIPTION OF THE DRAWING

The single figure of the drawing is a side elevational view, somewhat diagrammatic in character, of a test apparatus for determining the impact scuff resistance rating of the sheet material. This is one of the most important means known to the inventor for evaluating the utility of the product as an upper material for children's shoes.

DESCRIPTION OF PREFERRED EMBODIMENTS

The permeability value of the sheet material is more than 750, preferably more than 1500. The permeability value figures given herein are in terms of grams per hour per 100 square meters when the product is tested at 21° C. and 90% relative humidity for 3 hours by the general method described by Kanagy and Vickers in the Journal of American Leather Chemists Association, 45, 211–242 (Apr. 19, 1950).

The total pore volume and the size of the pores are determined by the well-known mercury intrusion (penetration) method; for example according to the general procedure described in "Pore Size Distribution by Mercury Penetration" by Winslow and Shapiro in the A.S.T.M. Bulletin, February 1959. A maximum pressure of 2500 p.s.i. is employed in carrying out this procedure for obtaining the pore size and pore volume figures given herein; and the tube is filled at 6.3 p.s.i.

Preferably about 65–100% of the pore volume of the layer of microporous polymeric material consists of pores having a cross-section diameter of up to about 2 microns, preferably about 0.07–2 microns; a small percentage (e.g., 0.1–5%) of the pores can be smaller than 0.07 micron; and prferably about 0–35% of the pore volume consists of pores having a cross-section diameter of greater than 2 microns, preferably about 2.01–100 microns. In certain preferred embodiments of this type of structure, up to about 30% of the pore volume consists of pores having a cross-section diameter of about 2.01–20 microns, and up to about 15% of the pore volume consists of pores having a cross-section diameter of about 20.01–100 microns. In still further preferred embodiments of this type of structure, the upper half of the microporous layer has a pore volume of up to about 28%, preferably about 12–28%, and the lower half of the layer has a pore volume of about 20–43%.

Another preferred embodiment of the sheet material is characterized as follows:
(a) in the upper half of the microporous layer, about 70–100% of the pore volume consists of pores having a cross-section diameter of up to about 2 microns and about 0–30% of the pore volume consists of pores having a cross-section diameter of greater than 2 microns,
(b) in the lower half of said layer, about 63–95% of the pore volume consists of pores having a cross-section diameter of up to about 2 microns and about 5–37% of the pore volume consists of pores having a cross-section diameter of greater than 2 microns, and
(c) at least 50%, preferably about 50–80%, of the total pore volume being in the lower half of said layer.

In some embodiments of the invention, the sheet material is in the form of an unsupported film, the film consisting essentially of said layer of microporous polymeric material. The film, of course, can be coated with a thin layer of a known coating composition adapted to modify its color, water repellency or other properties while retaining a satisfactory degree of vapor permeability and other characteristics needed for the particular end use. Also, the film can be bonded or otherwise combined with other sheet materials.

An especially useful and preferred embodiment of the invention is a composite leather-like sheet material comprising said layer of microporous polymeric material in superposed adherence with a porous fibrous substrate. The substrate is preferably a fabric; and the layer of microporous polymeric material preferably has a thickness of about 4–30 mils, still more preferably about 7–16 mils. Other known porous fibrous sheet materials can also be used as the substrate, for example paper, leather, man-made suede materials and webs formed by paper making techniques from fibrids or mixtures of fibrids and fibers. The fabric can be a woven fabric or a nonwoven fabric of any natural fibers or any synthetic fibers or blends thereof. Also useful are composite fabrics formed by assembling woven fabrics in face-to-face contact with nonwoven fabrics. One very useful fabric is a nonwoven fabric containing a solidified polymeric impregnant having a porous moisture-permeable structure; such a nonwoven fabric can be prepared, for example, by the procedure described in Example 1 of U.S. Pat. 3,067,483 issued Dec. 11, 1962 to J. L. Hollowell.

In the leather-like sheet material described in the previous paragraph, the polymeric material of the microporous layer preferably has a secant tensile modulus at 5% elongation of over 600 p.s.i., still preferably about 800–3000 p.s.i. The secant tensile modulus is the ratio of the stress to the strain at 5% elongation of the polymer sample determined from the tensile stress-strain curve, and is expressed as force per unit area, e.g., pounds per square inch (often expressed as p.s.i.). The secant tensile modulus measurement is carried out according to ASTM D–882–64–T, modified as described below.

The secant tensile modulus of the polymer is determined by forming a 5 to 20 mil thick continuous void-free polymer film from a polymeric solution, for example, the solution to be used to form the microporous polymeric layer of the sheet material of this invention. The film is formed by casting the polymeric solution on a glass plate and the solution is then dried, e.g., at 105° C. for 90 minutes.

The stress-strain curve, which is necessary to calculate the secant tensile modulus of the polymer, is preferably obtained on an Instron Tensile Tester, using a ½ inch wide specimen cut from the void-free polymeric film, with about one inch between grips. The following settings are preferably used on the Instron Tester to obtain a stress-strain curve: chart speed of 10 inches per minute, cross-head speed of 1 inch per minute, and a full scale load of 2 to 5 pounds.

The secant tensile modulus is obtained from the chart of the force vs. strain curve by drawing a line at 5% specimen elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

A preferred polymeric material for the microporous layer of the sheet material is one having a polyurethane elastomer content of at least 51% by weight and a vinyl chloride polymer (e.g., polyvinyl chloride) content of up to 49% by weight. Pigments and other additives can be added if desired.

The sheet material of the present invention can be prepared by a process which comprises (A) applying to a suitable substrate a layer of a liquid polymeric composition which is comprised of a polymer dispersed in a liquid comprising an organic solvent (e.g., one capable of absorbing water), and which layer is capable of being solidified in situ to form a microporous structure when applied to a substrate and then subjected to steps B, C and D below, (B) exposing said layer of liquid composition to an atmosphere adapted to initiate coagulation of the layer; e.g., exposing it to a humid air zone having a suitable relative humidity (e.g., 40%) and temperature (e.g., 26° C.) until said layer has absorbed enough water to cause at least the uppermost portion of the layer to coagulate, (C) bathing said layer of composition with a bathing liquid (e.g., water) adapted to extract the organic solvent from said composition until substantially all of said solvent is extracted, (D) drying the resulting sheet material, and (E) pressing the sheet material while at least the upper portion thereof is at an elevated temperature until the microporous structure is consolidated sufficiently to provide the structure described above in the Summary of the Invention. Steps B, C and D cause the composition to solidify in situ and become a microporous moisture-permeable structure.

Preferred hot-pressing conditions are described in Example 1. It is quite unexpected that the amount of hot-press-consolidation required to provide the sheet material with a substantial improvement in scuff resistance and abrasion resistance does not render the product unsatisfactory with respect to other properties, particularly moisture-permeability.

An especially useful liquid polymeric composition to apply to the substrate in the practice of this invention is a substantially colloidal polymeric dispersion which has been prepared by adding a nonsolvent to a polymer solution according to the method described in claim 1 of U.S. Pat. 3,100,721 issued Aug. 13, 1963 to E. K. Holden. The disclosure of this patent is incorporated herein by reference. Among the polymers useful in practicing the present invention are those described in this Holden Patent (e.g., see column 3 line 19 to column 6 line 63).

In various preferred embodiments of the invention, the liquid polymeric composition to be applied to the substrate is prepared by adding water to the polymer solution in an amount sufficient to provide the composition with a water content of about 3.7–4.5% based on the total weight of the resulting composition.

The bathing liquid employed in step (C) of the process described above is preferably water or a mixture of water and a water-miscible organic liquid (e.g., dimethylformmide). The bathing liquid employed in at least the last portion of step (C) is preferably volatile in the sense that it can be evaporated from the sheet material under drying conditions which cause no undue damage to the fiber and polymer components. The bathing liquid also is a coagulant for the liquid polymeric composition employed in preparing the sheet material; thus the bathing liquid is adapted to coagulate any of the polymeric composition which remains uncoagulated after step (B) when the bathing liquid comes in contact with the composition.

Some of the most useful and beneficial leather-like sheet materials and other products of the present invention have an impact scuff resistance rating of about 1–3 when tested as described below. They also have a Schiltknecht flex durability value of at least 4 million, preferably at least 10 million, as determined on the well-known Schiltknecht flex test apparatus described in Bulletin No. 105 published by Alfred Suter, 200 Fifth Avenue, New York city; the result is given as the number of cycles required to cause noticeable damage (e.g., cracking) to the surface of the product when viewed with the unaided eye at a distance of one foot under good lighting.

Also, the preferred sheet materials of this invention undergo a weight loss of not more than 0.4 gram (preferably not more than 0.2 gram) when the upper surface is subjected to 1000 strokes in a Taber abrasion test carried out by (1) weighing the sample of sheet material to be tested, (2) subjecting the upper surface of the sample to the abrasive action provided by the Taber Abraser, Model 503, as described and illustrated in Taber Instrument Corporation Bulletin No. 6504–1M, using a load weight of 1000 grams and Taber H–18 grinding stones until the surface has been subjected to 1000 strokes (revolutions), and (3) again weighing the sample and recording any loss in weight.

With reference to the drawing, the impact scuff resistance rating of the sheet material is determined by first providing a test apparatus as illustrated wherein base plate 10 is a heavy steel plate which rests on adjustable legs 11, Fulcrum 15 attached to the upper surface of plate 10 provides axial support for plate 12, which is made up of horizontal right arm 12a and left arm 12b. Left arm 12b supports a 10-pound weight (14). Screw 18 at the right end of arm 12a extends through the enlarged hole 13 in arm 12a and has its lower end fastened in a threaded hole in plate 10. As the right end of arm 12a is forced towards plate 10, the left end of arm 12b moves upward. Arm 12a supports a sample-mounting block 16 equipped with suitable known clamping means (not shown) for holding test sample 17 on block 16. Vertical pendulum support 19 has its lower end attached to plate 10 at a point such that the abrasive end 22 of pendulum 24 will hit the top surface of test sample 17 during the test with a vigorous impact and scuffing action similar in effect to hitting the sample a glancing blow with a club wrapped with coarse emery paper. One end of pendulum 24 is attached to bearing 20 at the top of support 19 so that abrasive end 22 can move in an arc towards sample 17 when catch 23 is released. Abrasive end 22 is formed by attaching to the swingable end of pendulum 24 a 2-pound weight 21 in the form of a semi-cylinder equipped with suitable known clamping means (not shown) for holding abrasive-coated paper on the outer curved surface of weight 21; then the abrasive-coated paper is clamped in place. The distance from bearing 20 to the center of the surface of abrasive end 22 is 9 inches; the distance from bearing 20 to the top surface of sample 17 is 0.15 inch less than 9 inches.

The test sample 17 of the sheet material measuring one inch wide and 6 inches long is clamped in place on block 16, the 6 inch side of the sample being parallel to the side of arm 12a. The abrasive paper clamped in place on weight 21 is known as 3M Tri-M-Ite Paper No. 60 (from Minnesota Mining and Manufacturing Company); it is understood that the abrasive surface is made up of grit size 60 silicon carbide particles.

The impact scuff test is performed by (1) releasing catch 23, (2) allowing pendulum 24 to swing downward from the horizontal position, (3) allowing abrasive end 22 to hit the top surface of sample 17 with a combination impact and scuffing action, the impact causing arm 12a to move towards plate 10 as the pendulum swings past block 16, (4) while holding arm 12a against plate 10, moving the pendulum back to the starting horizontal position in engagement with catch 23, (5) returning arm 12a to the horizontal position wherein it resets against the bottom of the head of screw 18, (6) repeating steps 1–4 for a total of 30 strokes, (7) examining the condition of the microporous layer of sample 17 with the unaided eye at a distance of 2 feet under good lighting, and (8) recording the impact scuff resistance rating of the sample in accordance with Table 1.

TABLE 1

| Rating: | Appearance of microporous polymeric layer |
| --- | --- |
| 1 | There is substantially no apparent damage. |
| 2 | A very small amount of material has been removed from the surface, but the damage is barely visible. |
| 3 | Slightly more removal of material than 2, but the general appearence of the sample is quite good. |
| 4 | Considerable removal of material—the kind of damage the average person would consider slightly objectionable on a pair of shoes. |
| 5 | Quite badly damaged; the appearance is definitely objectionable. |
| 6 | Extensive damage: substantially complete removal of the microporous layer in the area of impact by the abrasive end of the pendulum. |

Preferred embodiments of the sheet material of this invention are leather-like sheet materials (1) which are useful as shoe-upper materials for many kinds of shoes, particularly those which will receive much abuse, such as children's shoes; (2) which are surprisingly resistant to damage when subjected to the impact and the scuffing and abrasive action of such activities as crawling on abrasive surfaces, climbing, kicking abrasive articles, and hiking in rough terrain; and (3) which have sufficient flexibility, surface smoothness and moisture permeability so that the materials can be made into shoes which are bith attractive and comfortable.

Leather-like sheet materials of the present invention, because of their unusual combination of properties, also have beneficial utility for the manufacture of luggage, carrying case covers, upholstery and the like.

The invention also provides abrasion-resistant vapor-permeable unsupported microporous polymeric films which which are useful in such applications as filters and surgical bandages. These films can be bonded to fabrics and other substrates for the manufacture of leather-like sheets and many other useful composite articles.

The examples which follow are given for the purpose of illustrating the invention. All quantities shown are on a weight basis unless otherwise indicated.

Example 1

A surprisingly scuff-resistant moisture-permeable composite leather-like sheet material having beneficial utility as a shoe-upper material for children's shoes is prepared by (1) providing a nonwoven fabric which (a) has been made from polyester fibers, (b) contains as a solidified polymeric impregnant a polyurethane elastomer having a porous moisture-permeable structure, (c) has been prepared in accordance with the teaching of Example 1 of U.S. Pat. 3,067,483 (mentioned above), but greater in thickness, (d) has a thickness of 60 mils, a density of 0.38 gram per cubic centimeter, a width of 14 inches and a length of 100 yards, and (e) has been wound up on a storage roll;

(2) providing a liquid polymeric composition in which the polymer component has a secant tensile modulus at 5% elongation of about 1200 p.s.i., and which has been prepared by (a) making a blended polymer solution consisting of 12.9% polyurethane elastomer, 4.3% polyvinyl chloride and 82.8% dimethylformamide according to the following procedure: A 20% solution of polyurethane elastomer is prepared according to the procedure described in U.S. Pat. 3,284,274, column 11, lines 57–75, which patent issued Nov. 8, 1966 to D. G. Hulslander et al. Then the blended polymer solution is prepared by admixing a 12% solution in dimethylformamide of polyvinyl chloride with a suitable amount of the polyurethane solution, (b) converting the resulting solution to a substantially colloidal dispersion by gradually adding a 1:4 blend of water and dimethylformamide to the solution while stirring until the mixture has a water content of 4.0% and (c) adjusting the temperature of the resulting composition to 27° C.;

(3) coating the fabric provided in step 1 with the liquid polymeric composition at 27° C. provded n step 2 by polymeric composition at 27° C. provided in step 2 by means of a doctor-knife coating apparatus in an amount sufficient (about 65 mils) to obtain a film thickness of 20 mils at the end of step 5;

(4) passing the resulting composite sheet material coating-side-up at a speed of 20 feet per minute through a humidity chamber for a period of 40 seconds wherein the relative humidity is 40% and the temperature is 26° C., thereby causing the uppermost portion (a thin layer at the surface) of the liquid layer to coagulate;

(5) bathing the liquid polymeric composition of the resulting composite sheet by (a) immersing the sheet in a tank containing water at 18° C. for 9 minutes, (b) immersing the sheet in a tank containing water at 65° C. for 9 minutes, and (c) passing the sheet over a rotary vacuum drum provided with a supply of claim rinse water at a temperature of 80° C., thereby completing the coagulation of the polymer and the leaching therefrom of organic solvent;

(6) dyeing the sheet material brown by (a) dipping it in water at 94° C. for 20 seconds, (b) passing it between a pair of nip rolls to reduce the water content to 40%, (c) dipping it for one minute in a brown aqueous dye bath having a pH of 10.2 and a temperature of 94° C., and containing 3% of a brown dye (CI 20110), (d) passing it between a pair of rubber-covered nip rolls under a pressure of 75 pounds per inch (width of the sheet) (e) dipping it for 80 seconds in an aqueous dichromate solution having a temperature of 94° C. and containing 4 grams per liter of sodium dichromate and 2 grams per liter of acetic acid, (f) passing it between a pair of nip rolls under a pressure of 125 pounds per inch, (g) dipping it in water at 94° C. for 4 minutes, (h) passing it between a pair of nip rolls at 125 pounds per inch, and (i) drying the primer coat in a heat zone at 140° C.;

(8) applying to the primer coated surface by means of a sprayer 0.15 ounce per square yard (dry basis) of a brown acrylic emulsion base coat and drying the base coat in a heat zone at 140° C.;

(9) applying to the base coated surface of the sheet 0.05 ounce per square yard (dry basis) of a clear top coat and drying the sheet in a heat zone at 140° C., the top coat composition being a 3.4% solution of a 60:40 blend of plasticizer and cellulose acetate butyrate in a blended volatile organic solvent; and

(10) hot-press embossing and consolidating the sheet by passing it over a roller heated to 170° C. to preheat it and then passing it through an embossing apparatus generally as described as the preferred embodiment of U.S. Pat. 3,157,723 issued Nov. 17, 1964 to J. Hochberg; the surface of the 12 inch diameter roller which contacts the coated surface of the sheet is engraved to provide the surface of the sheet with a leather-like grain pattern; the roller has a temperature of 174° C.; each square inch of the sheet is in the nip for a period of 30 seconds (the sheet moves at 3 feet per minute through a nip having a length of 1.5 feet) under a pressure of 15 p.s.i.g. The sheet is then cooled to room temperature, and the bottom surface is buffed on a machine commonly used for raising a nap on fabrics, using an emery cloth covered roll, until a uniform nap is produced.

The product of Example 1 has a permeability value of 2000 and a Schiltknecht flex durability value of over 20 million. The microporous polymeric layer has a total pore volume of 27.5%. About 78% of the pore volume consists of pores having various porosimeter cross-section diameters within the range of about 0.07–2 microns; about 19% of the pore volume consists of pores having various cross-section diameters within the range of about 2.01–20 microns; and about 3% of the pore volume consists of pores having various cross-section diameters within the range of about 20.01–100 microns. The upper half of the microporous layer has a pore volume of about 26%, and the lower half has a pore volume of about 32%. In the upper half of the microporous layer, about 83% of the pore volume consists of pores having various porosimeter cross-section diameters in the range of about 0.07–2 microns, and about 17% of the pore volume consists of pores having various cross-section diameters in the range of about 2.01–100 microns. In the lower half of the layer, about 74% of the pore volume consists of pores having various diameters in the range of about 0.07–2 microns, and about 26% of the pore volume consists of pores having various diameters in the range of about 2.01–100 microns. About 56% of the pore volume is in the lower half of the microporous polymeric layer. The product has an impact scuff resistance rating of 2. In the Taber abrasion test (as described above), the sheet material undergoes a weight loss of 0.2 gram.

The coating compositions used in steps 7 and 8 of Example 1 are as follows:

| | Primer, parts | Base coat, parts |
|---|---|---|
| Total solids content | 24.5 | 20.0 |
| Aqueous dispersion of blended acrylic polymers, 34.5% resin solids (an iminated terpolymer of methyl methacrylate, ethyl acrylate and methacrylic acid) | 34.0 | 45.2 |
| Water | 35.8 | 37.2 |
| Aqueous dispersion of blended pigments to provide brown color | 30.2 | 17.6 |

Example 2

An unsupported polymeric film useful in filter and bandage applications is prepared by repeating Example 1 except (a) the nonwoven fabric is treated so that the microporous film can be removed, this being done by passing the fabric into a tank filled with water at 24° C. and passing the immersed fabric out of the tank and then between a pair of squeeze rolls whereby the water content of the fabric is reduced to 75% based on the combined weight of fabric and water;

(b) steps 6–9 are omitted;

(c) after the hot-press consolidation step, the microporous polymeric layer or film is removed from the substrate by merely pulling the film away from the substrate. The film has a permeability value of 5000; the other properties are similar to those described for the product of Example 1.

I claim:

1. A vapor-permeable sheet material having a permeability value of over 750 and comprising a layer of microporous polymeric material, said layer having a total pore volume of about 20–35%; and wherein about 65–100% of said pore volume consists of pores having a cross-section diameter of up to about 2 microns, and about 0–35% of said pore volume consists of pores having a cross-section diameter of greater than 2 microns.

2. An article according to claim 1 wherein up to about 30% of said pore volume consists of pores having a cross-section diameter of about 2.01–20 microns, and up to about 15% of said pore volume consists of pores having a cross-section diameter of about 20.01–100 microns.

3. An article according to claim 1 wherein the upper half of said layer has a pore volume of up to about 28%, and the lower half of said layer has a pore volume of about 20–43%.

4. An article according to claim 1 wherein
  (a) in the upper half of said layer, about 70–100% of the pore volume consists of pores having a cross-section diameter of up to about 2 microns and about 0–30% of the pore volume consists of pores having a cross-section diameter of greater than 2 microns,
  (b) in the lower half of said layer, about 63–95% of the pore volume consists of pores having a cross-section diameter of up to about 2 microns and about 5–37% of the pore volume consists of pores having a cross-section diameter of greater than 2 microns, and
  (c) at least 50% of the total pore volume being in the lower half of said layer.

5. An article according to claim 1 wherein said sheet material is in the form of an unsupported film which consists essentially of said layer of microporous polymeric material.

6. An article according to claim 1 wherein said sheet material is in the form of a composite leather-like sheet material comprising said layer of microporous polymeric material in superposed adherence with a porous fibrous substrate.

7. An article according to claim 6 wherein said substrate is a fabric, and said layer has a thickness of about 4–30 mils.

8. An article according to claim 7 having a permeability value of over 1500.

9. An article according to claim 8 wherein the polymeric material of said layer has a secant tensile modulus at 5% elongation of over 600 pounds per square inch.

10. An article according to claim 9 wherein at least 51% by weight of said polymeric material consists of a polyurethane elastomer and up to 49% by weight of said polymeric material consists of a vinyl chloride polymer.

11. An article according to claim 9 wherein the upper surface of the sheet material has an impact scuff resistance rating of about 1–3.

12. An article according to claim 11 wherein the sheet material undergoes a weight loss of not more than 0.4 gram when the upper surface is subjected to 1000 strokes in a Taber abrasion test.

13. An article according to claim 11 having a Schiltknecht flex durability value of at least 4 million.

References Cited

UNITED STATES PATENTS

| | | | |
|---|---|---|---|
| 3,100,721 | 8/1963 | Holden | 117—63 |
| 3,284,274 | 11/1966 | Hulslander et al. | 161—159 |
| 3,418,198 | 12/1968 | Einstman | 161—159 X |

ROBERT F. BURNETT, Primary Examiner

R. H. CRISS, Assistant Examiner

U.S. Cl. X.R.

117—65.2, 135.5; 161—159; 260—77.5